US011722077B2

(12) United States Patent
Egger et al.

(10) Patent No.: US 11,722,077 B2
(45) Date of Patent: Aug. 8, 2023

(54) MOTOR VEHICLE HAVING A FRONT DOOR AND A REAR DOOR

(71) Applicant: Continental Automotive GmbH, Hannover (DE)

(72) Inventors: Andreas Egger, Groß-Enzersdorf (AT); Marc Desgeans, Vienna (AT); Stefan Ehrlich, Vienna (AT); Johann Meier, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 471 days.

(21) Appl. No.: 16/616,911

(22) PCT Filed: May 23, 2018

(86) PCT No.: PCT/EP2018/063561
§ 371 (c)(1),
(2) Date: Nov. 25, 2019

(87) PCT Pub. No.: WO2018/219752
PCT Pub. Date: Dec. 6, 2018

(65) Prior Publication Data
US 2021/0172215 A1    Jun. 10, 2021

(30) Foreign Application Priority Data
May 29, 2017    (DE) ..................... 10 2017 208 983.0

(51) Int. Cl.
*H02P 1/54*    (2006.01)
*H02P 6/00*    (2016.01)
(Continued)

(52) U.S. Cl.
CPC .............. *H02P 6/00* (2013.01); *B60R 16/023* (2013.01); *E05B 81/06* (2013.01); *H02P 5/68* (2013.01);
(Continued)

(58) Field of Classification Search
CPC . B60R 16/023; H02P 5/68; H02P 6/04; H02P 29/00
See application file for complete search history.

(56) References Cited

U.S. PATENT DOCUMENTS

| 5,892,443 A | 4/1999 | Friedrich |
| 6,354,653 B1 | 3/2002 | Seeberger et al. |

(Continued)

FOREIGN PATENT DOCUMENTS

| CN | 201460566 | 5/2010 |
| CN | 102910052 A | 2/2013 |

(Continued)

OTHER PUBLICATIONS

Office Action dated Nov. 21, 2017 from corresponding German Patent Application No. DE 10 2017 208 983.0.
(Continued)

*Primary Examiner* — Karen Masih

(57) ABSTRACT

The disclosure relates to a motor vehicle having at least one vehicle side, on which a front door and a rear door are provided, and to a method for operating an electric motor in a respective rear door of the at least one vehicle side. The disclosure relates to a motor vehicle having at least one vehicle side, on which a front door and a rear door are provided, wherein an electric motor configured to provide a motorized door function is provided in the rear door and wherein a control device configured to operate the motor which is connected to the motor via electrical conductor elements for transferring a motor current is provided. According to the disclosure, the control device is arranged in the front door and is configured to also control at least one door function of the front door.

12 Claims, 2 Drawing Sheets

Figure 1:
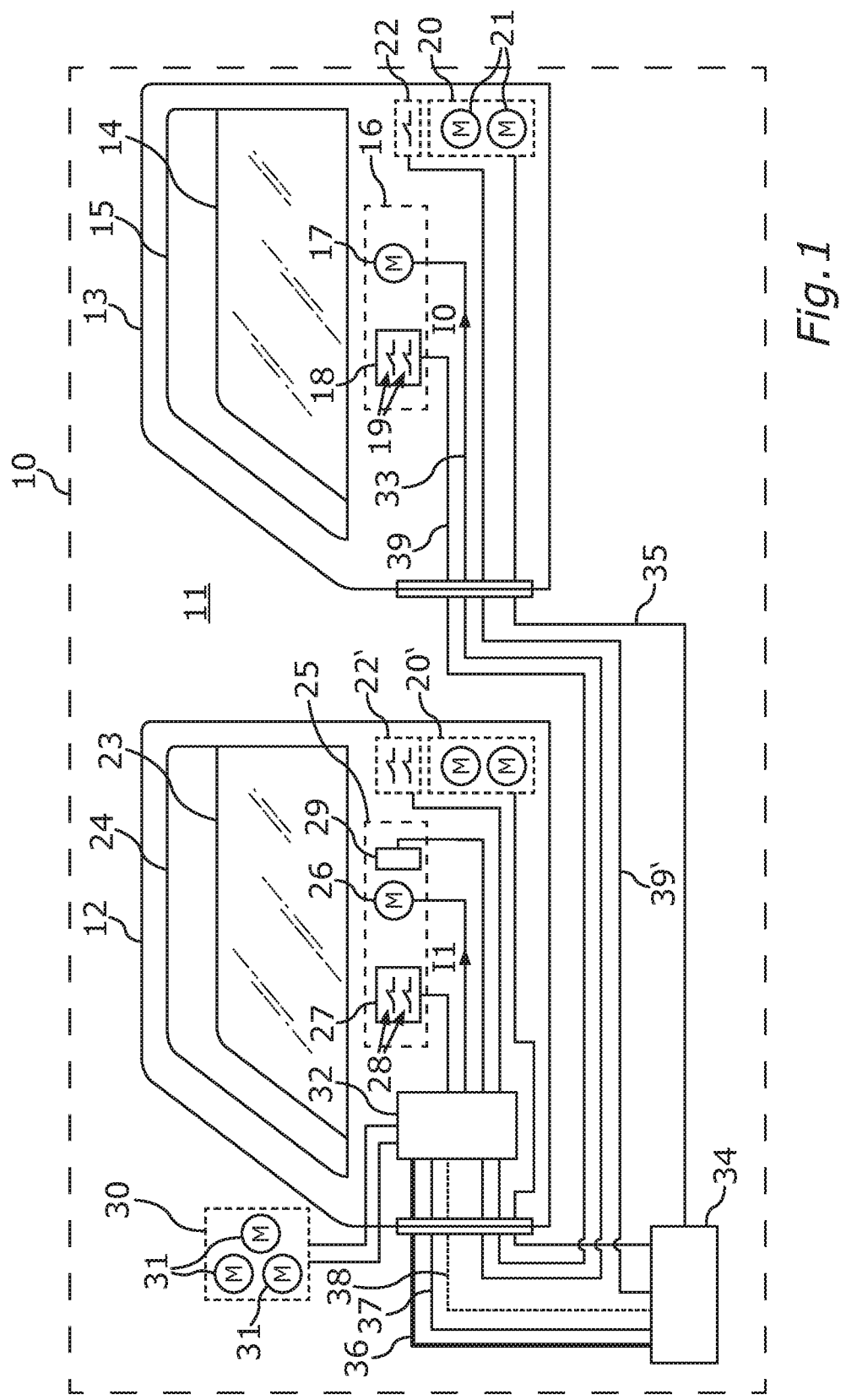

(51) Int. Cl.
    *E05B 81/06*     (2014.01)
    *B60R 16/023*     (2006.01)
    *H02P 5/68*     (2006.01)
    *H02P 6/04*     (2016.01)
    *H02P 29/00*     (2016.01)
    *E05F 11/38*     (2006.01)
    *E05F 15/697*     (2015.01)

(52) U.S. Cl.
    CPC ............... *H02P 6/04* (2013.01); *E05F 11/382* (2013.01); *E05F 15/697* (2015.01); *H02P 29/00* (2013.01)

(56) References Cited

U.S. PATENT DOCUMENTS

| | | | |
|---|---|---|---|
| 6,407,520 | B1 | 6/2002 | Kleefeldt et al. |
| 2005/0264031 | A1 | 12/2005 | Mitsui |
| 2007/0085423 | A1 | 4/2007 | Chin et al. |
| 2008/0217956 | A1 | 9/2008 | Gschweng et al. |
| 2008/0319607 | A1 | 12/2008 | Schindler |
| 2008/0319608 | A1 | 12/2008 | Pothin |
| 2013/0031837 | A1 | 2/2013 | Charnesky et al. |
| 2016/0208541 | A1 | 7/2016 | Goto |
| 2020/0282813 | A1* | 9/2020 | Seibold ...................... B60J 1/17 |

FOREIGN PATENT DOCUMENTS

| | | |
|---|---|---|
| CN | 203318323 | 12/2013 |
| CN | 203783335 | 8/2014 |
| CN | 204827010 | 12/2015 |
| DE | 20217919 U1 | 12/2003 |
| DE | 10338789 B4 | 3/2005 |
| DE | 202005016196 U1 | 2/2007 |
| DE | 102014218085 A1 | 3/2015 |
| DE | 102015226829 A1 | 7/2017 |
| EP | 0856629 A1 | 8/1998 |
| JP | S60-189627 A | 9/1985 |
| JP | H09-98591 A | 4/1997 |
| JP | H09-195628 A | 7/1997 |
| JP | 3054809 B2 | 9/1997 |
| JP | 3054809 U | 12/1998 |
| JP | 2002-106256 A | 4/2002 |
| JP | 2014-136879 A | 7/2014 |
| JP | 2015098687 A | 5/2015 |
| KR | 10-2005-0068731 A | 7/2005 |
| KR | 10-2007-0042610 A | 4/2007 |
| KR | 10-2008-0038343 A | 5/2008 |

OTHER PUBLICATIONS

International Search Report and Written Opinion dated Aug. 16, 2018 from corresponding International Patent Application No. PCT/EP2018/063561.

Search dated Aug. 24, 2020 from corresponding Chinese patent application No. 201880021552.7.

First Office Action dated Sep. 2, 2020 from corresponding Chinese patent application No. 201880021552.7.

Notice of Reasons for Refusal dated Nov. 4, 2020 from corresponding Japanese patent application No. 2019-559702.

* cited by examiner

MOTOR VEHICLE HAVING A FRONT DOOR AND A REAR DOOR

The invention relates to a motor vehicle, which has at least one vehicle side, on each of which a front door and a rear door are provided. At least the rear door has an electric motor for a motorized door function. The invention also includes a method for operating the electric motor.

A motor vehicle can be provided with four vehicle doors, namely a front door and a rear door on each side of the vehicle (right and left). An electric motor can be provided in a vehicle door, to provide an electric window lifting function, for example. Such a motor can move or slide a window panel of the vehicle door in the window frame. In order to control an electric motor, thus to switch its motor current, a control device is required.

In general, such a control device can thus control at least one door function, for example the said window lifting function, a wing mirror, a light. This correspondingly results in a high number of electrical cables to connect the control unit to the respective door function (window lifting control, door mirrors, lighting). If there is one control unit per vehicle door, this also requires in particular the individual connection of each control unit to a central control unit, which is arranged outside the vehicle doors. To do this, a line of a communication bus, for example, a CAN bus (CAN—Controller Area Network) must be laid to each of the control units.

The provision of two control units on each side of the vehicle (one each for the front door and the rear door) and the connection of each control unit to a communication bus of the motor vehicle is thus technically complex. This makes the motor vehicle expensive to produce.

The object of the invention is to reduce the technical effort required to control door functions in vehicle doors of a motor vehicle.

The object is achieved by means of the subject matter of the independent patent claims. Advantageous developments of the invention are described by the dependent patent claims, the following description and the figures.

The invention provides a motor vehicle, in which on at least one side of the vehicle, a front door and a rear door are provided in each case. In the rear door an electric motor for a motorized door function is provided. To operate the motor a control unit is provided, which in order to transfer a motor current is connected to the motor via electrical conductor elements. In accordance with the invention it is provided that the control unit for this motor of the rear door is not also arranged in the rear door but in the front door, and is configured to also control at least one door function of the front door. In other words, on each side of the vehicle only one control unit is provided, which controls both the motorized door function of the rear door and the at least one door function of the front door.

The invention provides the advantage that only one control unit need be provided for each side of the vehicle, and thus the communication bus also only needs to be routed to one control unit on each side of the vehicle.

In the front door, the control unit can control, for example, at least one of the said door functions of window lifting, door mirror adjustment, lighting control. The rear door does not require a separate control unit, i.e., in particular, no microcontroller and no semiconductor switches to control the electric motor. A semiconductor switch can be formed, for example, by a transistor or a circuit consisting of a plurality of transistors. The conductor elements via which the control unit of the front door is connected to the electric motor in the rear door can be a cable or wire, for example. One of the conductor elements can also be formed at least partly by vehicle frames of the motor vehicle, which can then be used as a ground potential to close the electrical circuit.

The invention also includes developments that provide additional advantages by their features.

One development provides that the control unit is configured to adjust a switching rate or switching frequency, by means of which the control unit switches the motor current, as a function of a currently selected receiving frequency of a radio receiver of the motor vehicle. The switching rate may be obtained, for example, from a pulse-width modulation for adjusting an average current intensity of the motor current. The switching rate (switching operations per second) is adjusted to the receiving frequency in such a way that the switched motor current has a temporal profile or a time signal, of which the fundamental frequency and every harmonic frequency or overtone frequency differs from the receiving frequency of the radio receiver. This will prevent the radio reception of the radio receiver being subject to interference. The radio receiver can be, for example, a radio of the motor vehicle. The radio receiver can signal the receiving frequency currently set, for example, over said communication bus to the control unit directly or indirectly using the said central control unit. The development thus compensates for the radiated power from radio waves emitted by the conductor elements, which can result due to the length of the conductor elements.

To control or adjust the motor current, the control unit can have power electronics for switching the motor current. Such power electronics can comprise, for example, a transistor or a plurality of transistors. A relay can also be provided, provided no controlled or regulated motor current is needed, but only switching between 0% and 100%. If the motor of the rear door is a DC motor, then a so-called H-bridge can be provided to control the DC motor, for example. One of the conductor elements is thus connected in each case via a semi-conductor switch to both the positive potential, firstly, and to the negative potential or ground potential of the electrical on-board power supply of the motor vehicle, secondly.

In order to control the motor into a desired rotational position or with a desired speed, a sensor can be provided in the motor. To eliminate the need for this, one development provides that an evaluation device of the control unit is configured, on the basis of a temporal profile of the motor current, to determine a rotational position and/or a rotational speed and/or a travel of the motor. The motor current is therefore evaluated in relation to its temporal profile or its changes over time, to obtain information on the motion of the motor. Then, there is also no need for an additional sensor cable to connect a sensor in the rear door to the control unit in the front door. The said evaluation device can be provided as a program module of a microcontroller of the control unit. The evaluation device can also be implemented, for example, on the basis of an ASIC (Application Specific Integrated Circuit) and/or a circuit using discrete electronic components. The evaluation device can use a current measurement and/or voltage measurement of the control unit, in order to record the temporal profile of the motor current.

To do so, the evaluation device can be configured to identify and count waves in the temporal profile, in order to determine the rotational position and/or the rotational speed and/or the travel. Such a wave can be a local maximum or a local minimum or a sequence of a local maximum and local minimum. Such a wave can be identified in a known manner by comparing measured values to determine a maximum and/or minimum. A wave corresponds to a change in the rotary position of a rotor of the motor, which occurs as a result of the varying reluctance of the motor produced during the motion of the rotor. By counting the number of waves, the range of movement or rotational position change of the rotor can be determined. If the duration is also taken into account in this procedure, the rotational speed can be deduced. Taking into account the geometry of the motor, it can then be determined how far the motor turns with each wave, which yields the travel.

If the evaluation device is provided for the rear door and if the at least one door function of the front door also provides an electric motor, then in accordance with one development the evaluation device may also be configured, on the basis of a temporal profile of a motor current of the motor of the front door, to also determine the rotational position and/or rotational speed and/or travel of said motor. Thus there is no need also to provide a sensor for the electric motor of the front door for detecting the rotational position and/or rotational speed and/or the travel. Due to the developments described, therefore, the motor of the rear door and, optionally, a motor of the front door can be operated without sensors.

The motorized door function of the rear door is in particular an electric window lifting function. The motor of the rear door is thus part of an electric window controller. The position of a window of the window controller can thus be adjusted by the control unit by switching the motor current of the motor.

In order to provide a control possibility for the motorized door function of the rear door, one development provides that in the rear door at least one switch is provided to control the motor and the at least one switch is electrically connected to the control unit of the front door via at least one wire, in order to detect an operator action performed on the switch. For example, the at least one switch can be part of a rocker switch, for example, via which a user can move a window panel in the rear door using the electric window lifting function to open the window or close the window.

The wiring between the control unit and the respective door function of the rear door requires longer cables than the wiring of the door functions of the front door to the control unit. Accordingly, the control device is provided in the door along with the majority of door functions. In other words, the control unit is configured to control more door functions in the front door than in the rear door.

In the manner described above, the motor vehicle can have the central control unit provided outside the front door and rear door of each side of the vehicle. The control unit can be coupled to the respective control unit of the front door of the respective vehicle side via a communication bus in the manner described above. A communication bus to the rear door is not necessary. Hence if the central control unit then wishes to control a door function of the rear door, this would be carried out indirectly via the control unit of the front door. In the case of a time-critical door function, however, this would be detrimental. This time-critical door function is, in particular, a keyless access technology, in other words a central locking system based on a wireless key. A wireless key in this case does not need to be operated by the user. Instead, the user actuates a door handle of the front door or the rear door, whereupon the central locking system determines whether an authorized wireless key can be detected in the external area of the motor vehicle via radio. If this is the case, the central locking system unlocks the vehicle doors by controlling a respective lock motor. This must take place during the actuation of the door handle, so that upon reaching the altered position of the door handle the user can actually successfully open the vehicle door, that is to say, the lock motor must have unlocked the door lock of the vehicle door in time. It is therefore necessary to open the door latch of the door lock in a very short time, for the operation of the door handle by an authorized person to successfully lead to opening of the door. A very short time here means a time of less than 500 ms, in particular less than 200 ms.

One development provides that the central control unit is provided for directly controlling a lock of lock motors of each front door and each rear door of the motor vehicle. The central control unit is thus provided for directly controlling the lock motors of each front door and each rear door. The lock motors are thus controlled by the central control unit, bypassing the control unit of each front door. As a result, when a door handle of one of the vehicle doors (front door or rear door) is operated and upon successful verification of a wireless key, then in less than 500 ms, in particular less than 200 ms, the lock motor of each front door and each rear door can be activated.

The invention also includes a method for operating an electric motor in a respective rear door of at least one vehicle side of a motor vehicle. In the manner described above, on the at least one vehicle side one control unit is provided in a front door of the vehicle side, which controls at least one door function of the front door but which also controls a motor current of the motor in the rear door via electrical conductor elements. The motor current in these conductor elements is thus switched.

The invention also includes a door control arrangement for a motor vehicle with at least one vehicle side having a first and a second door. The door control arrangement has the following features. It has an electric motor to be provided in the second door, in order to implement a motorized door function there. It also has a control unit to be provided in the first door and to operate the motor, the control unit being connected to the motor via electrical conductor elements for transferring a motor current. The control unit is further configured to also control at least one door function of the first door. In doing so, the first door can be a front door of the motor vehicle, and the second door a rear door, or vice versa.

The invention also includes developments of the method according to the invention and the door control arrangement according to the invention, which have features that have already been described in the context of the developments of the motor vehicle according to the invention. For this reason, the corresponding developments of the method according to the invention and the door control arrangement will not be described again here.

Figure 2:
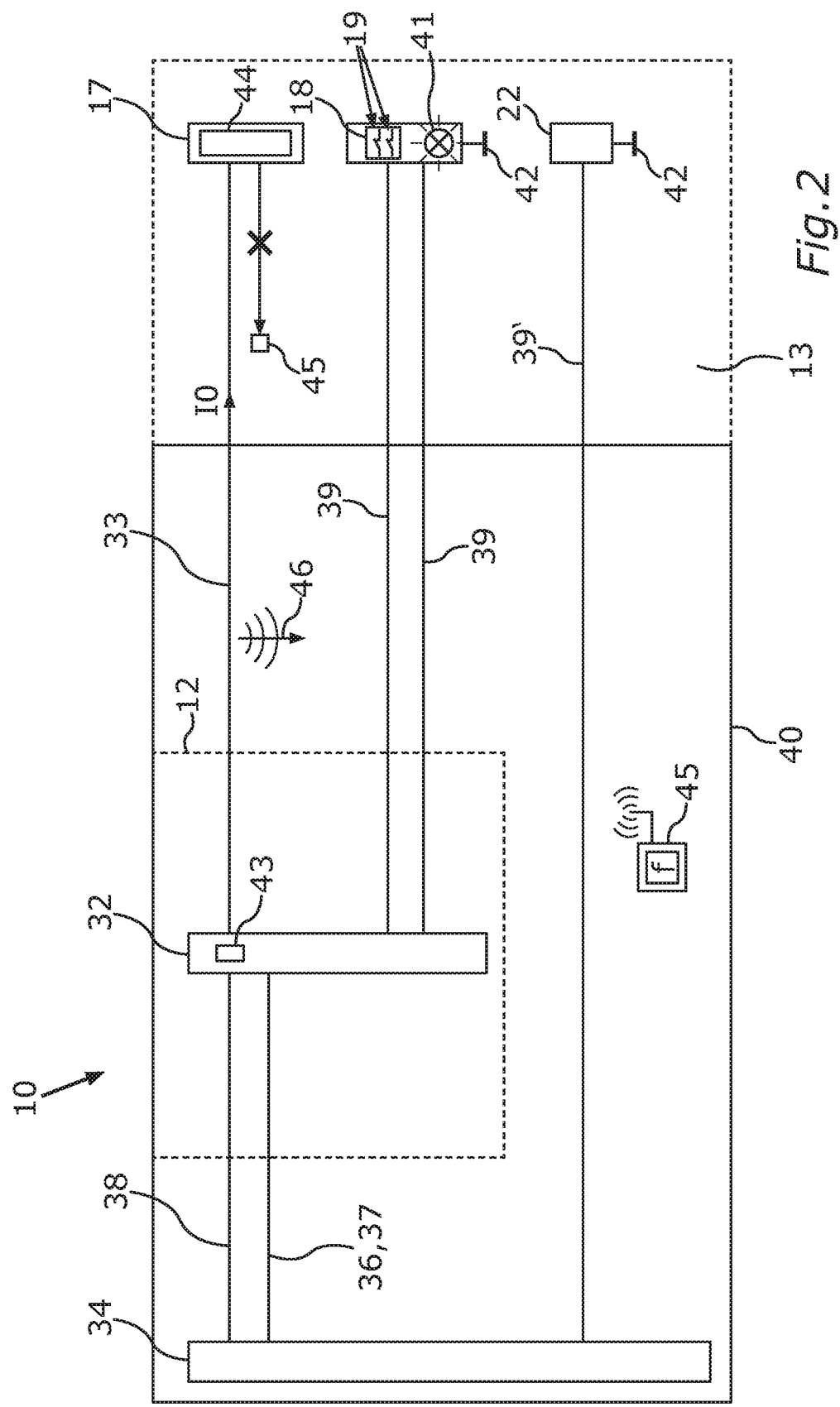

An exemplary embodiment of the invention is described in the following. To this end, in the figures:

FIG. 1 shows a schematic illustration of an embodiment of the motor vehicle according to the invention; and FIG. 2 shows a schematic circuit diagram of the motor vehicle of FIG. 1.

The exemplary embodiment explained below is a preferred embodiment of the invention. In the exemplary embodiment, the components of the embodiment described represent individual features of the invention to be considered independently of each other, which also develop the invention independently of each other and thus are also to be regarded, either individually or in a combination other than the one shown, as an integral part of the invention. Furthermore, the embodiment described may also be supplemented by further features of the invention from among those that have already been described.

In the figures, functionally identical elements are provided with the same reference numerals in each case.

FIG. 1 shows a motor vehicle 10, which may be an automobile, in particular a passenger vehicle. The motor vehicle 10 can have a front door 12 and a rear door 13 on one vehicle side 11 in the known manner. The rear door 13 can have a window panel 14, which is arranged such that it can be slid or moved in a window frame 15. In the rear door 13 an electric window lifting function can be provided as a motorized door function 16. For this purpose, an electric motor 17 (M), for example a DC motor, can be provided. To switch the motor 17, a control element 18 with at least one switch 19 can be provided in the rear door 13. A door lock 20 of the rear door 13 can have at least one lock motor 21, to be able to lock and unlock the door lock 20 electrically. The door lock 20 can therefore be a component of a central locking system of the motor vehicle 10. A switch for a child safety lock 22 of the door lock 20 may be provided.

The front door 12 can have a window panel 23, which is arranged such that it can be slid or moved in a window frame 24. An electric window lifting function for the window panel 23 can be provided as a motorized door function 25. For this purpose the front door 12 can provide an electric motor 26 and a control element 27 with at least one switch 28 for switching the motor 26. A current rotational position and/or rotational speed of the motor 26 can be detected by a sensor 29. An external door mirror 30 of the front door 12 can have electric motors 31 for rotating a mirror of the external door mirror 30. It is also possible to adjust a bending angle between two mirrors. The electrically adjustable external door mirror 30 represents a further door function of the front door 12, controlled by the control unit 32.

To control the motorized vehicle function 29 and the motors 31 of the external door mirror 30 and the evaluation of the signal of the sensor 29, the front door 12 can have a control unit 32, which can have, for example, a microcontroller and semiconductor switches (for example, transistors) for switching a motor current I1 of the motor 26.

In the motor vehicle 10 it can be provided that a motor current I0 of the motor 17 of the rear door 13 is also controlled by the control device 32 of the front door. For this purpose a conductor element 33, for example a cable, can be routed from the control unit 32 to the rear door 13 and the motor 17.

This indirect coupling to the motor 17 via the control unit 32, however, does not introduce a delay in the activation of the lock motors 21 of the door lock 20 of the rear door 13. Instead, a central control unit 34 is provided, which can be directly connected to the door lock 20 via conductor elements 35. A plus conductor 36 and a minus conductor 37 for supplying the motors 26, 17 can be routed to the front door 12. Likewise, a communication bus 38 only needs to be routed to the front door 12, i.e. not to the rear door 13.

The control unit 32 can be wired via a respective electrical conductor element 39 to the control element 18, i.e. the switches 19. The switch for the child safety lock 22 can also be wired directly to the control unit 34 via a conductor element 39'. The conductor elements 39, 39' can each be formed by a wire.

The interconnection of some elements is illustrated once again in FIG. 2. The central control unit 34 can be located or arranged outside each vehicle door in a vehicle shell 40. Also shown are the rear door 13 and the front door 12. The component of the front door 12 shown is the control unit 32.

The components of the rear door 13 shown are the motor 17, the control element 18, the switch for the child safety lock 22 and a switch lighting 41 for the switches 19 of the control element 18. Electrical power to operate the motor 17 can be transferred via the at least one electrical conductor element 33 from the control unit 32 to the motor 17. The motor current I0 can switch the control unit 32 in a known manner, for example by means of pulse-width modulation.

A power circuit for the switches 19 of the control element 18, the switch lighting 41 and the child safety lock 22 can be closed, for example, via a ground potential 42 that can be formed by a frame of the motor vehicle 10.

By virtue of the fact that the control unit 32 determines the temporal profile of the motor current I0, for example by measuring the current I0 and/or an electrical voltage in the conductor element 33, an evaluation device 43 in the control unit 32 can be used to detect or track the rotation of a rotor 44 of the motor 17. This allows a rotational position and/or rotational speed of the rotor 44 and/or a travel position of the motor 17 and thereby the window panel 14 to be determined, without the need for feedback 45 from a sensor via a separate sensor conductor from the motor 17 to the control unit 12.

The at least one conductor element 43 can comprise a wire or cable, or even a plurality of wires or cables.

The door controller or control unit 32 of the front door 12 thus also controls the functionality of the rear door 13, i.e. the motorized door function 16, at the same time. It is advantageous if the motor 17 is monitored at the same time without sensors by means of the evaluation device 32. This eliminates a sensor cable from the motor 17 back to the control unit 32. Optionally, the sensor 29 of the front door can also be omitted or dispensed with, and the motor 26 in the front door also evaluated or monitored by the evaluation device 43.

This results in only one control unit 32 per vehicle side 11 (right and/or left), for both the front door 12 and the rear door 13.

This will reduce the number of cables used with a simultaneous reduction from two control units to one control unit 32. This means weight reduction as well as savings in the required installation space in the rear door 13, which can be used for other items.

The control unit 32 can additionally adjust the switching of the current I0 in relation to the pulse-width modulation and its switching rate to a receiving frequency f of a radio receiver 45 of the motor vehicle 40, which can communicate this to the control unit 32. This means that on the conductor or the conductor element 33 between the front door 12 and the rear door 13, interference radiation 46 is only emitted at frequencies that are different to the receiving frequency f. The pulse-width modulation frequency is therefore adjusted such that it does not cause interference at the receiving frequency f set in the radio receiver 45. This saves expensive filters. The radio receiver 45 can be, for example, a radio of the motor vehicle 10.

The front door 12 can also have a door lock 20' with lock motors (labeled with M), which can be designed in the same way as for the rear door 13. The front door 12 can also have a switching element 22' for controlling a locking mechanism from the inside. Thus, access can be blocked from the outside and also exit/access can be blocked from the inside. This means that the vehicle cannot be opened "normally" even if the window is fully closed. This function is referred to, for example, as a safety lock, deadlock or double lock.

Overall, the example shows how by means of the invention a cable-optimized door architecture can be provided, in which the central locking is controlled using a separate/central control unit.

LIST OF REFERENE NUMERALS 10 motor vehicle
11 vehicle side
12 front door
13 rear door
14 window panel
15 door frame
16 motorized door function
17 motor
18 control element
19 switch
20 door lock
20' door lock
21 lock motor
22 child safety lock
22' switching element
23 window panel
24 door frame
25 door function
26 motor
27 control element
28 switch
29 sensor
30 external door mirror
31 motor
32 control unit
33 conductor element
34 central control unit
35 conductor element
36 positive conductor
37 negative conductor
38 communication bus
39' conductor element
40 vehicle shell
41 switch lighting
42 ground potential
43 evaluation device
44 rotor
45 radio receiver
46 interference radiation
I0 motor current
I1 motor current

The invention claimed is:

1. A motor vehicle having at least one vehicle side, on each of which a front door and a rear door are provided, wherein in the rear door an electric motor configured to provide a motorized door function is provided and wherein to operate said motor a control unit is provided, which is connected to the motor via electrical conductor elements configured to transfer a motor current, the control unit being arranged in the front door and configured to also control at least one door function of the front door;
wherein the control unit is configured to adjust a switching rate by which the control unit switches the motor current, as a function of a currently selected receiving frequency of a radio receiver of the motor vehicle.

2. The motor vehicle as claimed in claim 1, wherein the control unit comprises power electronics configured to switch the motor current of the motor, and an evaluation device of the control unit is configured, based on a temporal profile of the motor current, to determine at least one of a rotational position, a rotational speed and travel of the motor.

3. The motor vehicle as claimed in claim 2, wherein the evaluation device is configured to identify and count waves in the temporal profile, and in response determine at least one of the rotational position, the rotational speed and the travel.

4. The motor vehicle as claimed in claim 2, wherein the at least one door function of the front door also provides an electric motor and the evaluation device is configured, based on a temporal profile of a motor current of the motor of the front door, to determine at least one of the rotational position, rotational speed and travel of said motor.

5. The motor vehicle as claimed in claim 1, wherein the motorized door function of the rear door is an electric window lifting function.

6. The motor vehicle as claimed in claim 1, wherein in the rear door at least one switch configured to switch the motor is provided and registering an operator action executed on the switch comprises electrically interconnecting the at least one switch to the control unit via at least one wire.

7. The motor vehicle as claimed in claim 1, wherein the control unit is configured to control more door functions in the front door than in the rear door.

8. The motor vehicle as claimed in claim 1, wherein outside the front door and the rear door of each vehicle side, a central control unit configured to control lock of lock motors of each front door and each rear door is provided.

9. A door control arrangement for a motor vehicle with at least one vehicle side having a first and a second door, the door control arrangement comprising:
an electric motor configured to provide a motorized door function in the second door,
a control device configured to operate the motor:
connected to the motor via electrical conductor elements configured to transfer a motor current, and configured to be provided in the first door, and to control at least one door function of the first door;
wherein the control device is configured to adjust a switching rate by which the control device switches the motor current, as a function of a currently selected receiving frequency of a radio receiver of the motor vehicle.

10. The door control arrangement as claimed in claim 9, wherein the first door is a front door and the second door is a rear door of the motor vehicle.

11. The door control arrangement as claimed in claim 9, wherein the second door is a front door and the first door is a rear door of the motor vehicle.

12. A method for operating an electric motor in a respective rear door of at least one vehicle side of a motor vehicle, wherein on the at least one vehicle side one control unit is provided in a front door of the vehicle side, which controls at least one door function of the front door, the control unit controlling a motor current of the motor in the rear door via electrical conductor elements;
wherein the control unit is configured to adjust a switching rate by which the control unit switches the motor current, as a function of a currently selected receiving frequency of a radio receiver of the motor vehicle.

* * * * *